(12) United States Patent
Gebregergis et al.

(10) Patent No.: US 8,924,082 B2
(45) Date of Patent: Dec. 30, 2014

(54) SYSTEM AND METHOD FOR CONTROLLING A MOTOR

(75) Inventors: Abraham Gebregergis, Saginaw, MI (US); Ramakrishnan RajaVenkitasubramony, Saginaw, MI (US); Tomy Sebastian, Saginaw, MI (US); Niharika P. Popy, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 47 days.

(21) Appl. No.: 13/435,995

(22) Filed: Mar. 30, 2012

(65) Prior Publication Data
US 2013/0261896 A1 Oct. 3, 2013

(51) Int. Cl.
*B62D 6/00* (2006.01)

(52) U.S. Cl.
USPC ............................................. 701/42; 701/41

(58) Field of Classification Search
CPC ......... H02P 6/165; H02P 6/08; B62D 5/0472; B62D 5/0463; B62D 5/065; B62D 5/049; B62D 5/0484; B62D 5/0469; B62D 5/08; B62D 6/001; B62D 6/003; B62D 6/008
USPC ........ 701/41, 42, 71; 180/422, 443, 444, 446; 307/75; 318/565; 60/422
See application file for complete search history.

(56) References Cited

U.S. PATENT DOCUMENTS

| | | |
|---|---|---|
| 4,713,596 A | 12/1987 | Bose |
| 4,733,149 A | 3/1988 | Culberson |
| 5,196,778 A | 3/1993 | Hayashida |
| 5,410,234 A | 4/1995 | Shibata et al. |
| 5,652,495 A | 7/1997 | Narazaki et al. |
| 5,962,999 A | 10/1999 | Nakamura et al. |
| 6,152,254 A * | 11/2000 | Phillips .......................... 180/422 |

(Continued)

FOREIGN PATENT DOCUMENTS

EP 2003010 A2 12/2008

OTHER PUBLICATIONS

F. Briz, M.W. Degner and R.D. Lorenz; "Analysis and Design of Current Regulators Using Complex Vectors", IEEE Industry Applications Society; Annual Meeting; New Orleans, Louisiana; Oct. 5-9, 1997; pp. 1504-1511.

(Continued)

*Primary Examiner* — Tuan C. To
*Assistant Examiner* — Yuri Kan
(74) *Attorney, Agent, or Firm* — Cantor Colburn LLP

(57) ABSTRACT

A method for controlling operation of a torque-assist motor includes determining a rotational position of the torque-assist motor and producing a motor speed signal that is indicative of a rotational speed of the motor. One or more gain factors are produced based on the rotational speed of the torque-assist motor. An electrical current applied to the torque-assist motor is detected, and a current error is calculated based on a commanded electrical current and the electrical current applied to the torque-assist motor. A quadrature axis voltage is calculated based on the current error and the one or more gain factors. An inverter is driven with a direct voltage signal that is phased with the rotational position of the torque-assist motor so as to produce the electrical current applied to the torque-assist motor. The electrical current exhibits a characteristic that is affected by the quadrature axis voltage.

20 Claims, 4 Drawing Sheets

(56) References Cited

U.S. PATENT DOCUMENTS

| | | | |
|---|---|---|---|
| 6,222,334 B1 | 4/2001 | Tamagawa et al. | |
| 6,288,515 B1 | 9/2001 | Hiti et al. | |
| 6,370,459 B1* | 4/2002 | Phillips | 701/41 |
| 6,465,975 B1 | 10/2002 | Naidu | |
| 6,499,559 B2* | 12/2002 | McCann et al. | 180/446 |
| 6,605,912 B1 | 8/2003 | Bharadwaj et al. | |
| 6,700,342 B2 | 3/2004 | Hampo et al. | |
| 6,900,607 B2 | 5/2005 | Kleinau et al. | |
| 7,034,493 B2 | 4/2006 | Yoshimoto et al. | |
| 7,071,649 B2 | 7/2006 | Shafer et al. | |
| 7,145,310 B2 | 12/2006 | Ihm et al. | |
| 7,199,549 B2 | 4/2007 | Kleinau et al. | |
| 7,207,412 B2* | 4/2007 | Uryu | 180/443 |
| 7,394,214 B2 | 7/2008 | Endo et al. | |
| 7,576,506 B2 | 8/2009 | Kleinau et al. | |
| 2002/0175649 A1 | 11/2002 | Reutlinger | |
| 2006/0000209 A1* | 1/2006 | Tsuda et al. | 60/422 |
| 2006/0100766 A1* | 5/2006 | Schwarz et al. | 701/71 |
| 2006/0122751 A1* | 6/2006 | Oyama et al. | 701/41 |
| 2007/0043490 A1* | 2/2007 | Yokota et al. | 701/41 |
| 2007/0046126 A1 | 3/2007 | Sagoo et al. | |
| 2009/0026994 A1* | 1/2009 | Namuduri et al. | 318/565 |
| 2009/0027000 A1 | 1/2009 | Gallegos-Lopez et al. | |
| 2009/0069979 A1* | 3/2009 | Yamashita et al. | 701/42 |
| 2009/0114470 A1* | 5/2009 | Shimizu et al. | 180/444 |
| 2009/0234538 A1 | 9/2009 | Ta et al. | |
| 2011/0153162 A1* | 6/2011 | Kezobo et al. | 701/42 |
| 2011/0175556 A1 | 7/2011 | Tobari et al. | |
| 2012/0112549 A1* | 5/2012 | Perisic et al. | 307/75 |
| 2012/0221208 A1* | 8/2012 | Kojo et al. | 701/41 |

OTHER PUBLICATIONS

European Search Report for EP Application No. 12196930.7, mailed from the European Patent Office on Mar. 22, 2013; 7 pages.

James L. Kirtley, Jr.; Massachusetts Institute of Technology; Department of Electrical Engineering and Computer Science; 6.061 Introduction to Power Systems; Class Notes Chapter 12; Permanent Magnet "Brushless DC" Motors; Spring 2011; 34 pages.

Lennart Harnefors and Hans-Peter Nee; "Model-Based Current Control of AC Machines Using the Internal Model Control Method"; IEEE Transactions on Industry Applications; vol. 34, No. 1; Jan./Feb. 1998; pp. 133-141.

\* cited by examiner

SYSTEM AND METHOD FOR CONTROLLING A MOTOR

BACKGROUND OF THE INVENTION

The subject invention relates to systems and methods for controlling a motor and, more particularly, to systems and methods for controlling operation of a torque-assist motor of an electrical power-assist system of a motor vehicle.

In a permanent magnet machine, in which current is controlled using a feedback controller, such as a PI controller, either or both of the proportional gain and the integral gain can be adjusted to achieve increased frequency response, and thus greater bandwidth. Unfortunately, however, increases in gain often entail the negative consequence of amplifying noise that is inherent in the feedback signal (e.g., the current signal). In a vehicle steering system with electric power assist, the amplification of noise associated with the current that drives the assist motor can produce vibrations in the vehicle steering handwheel, which vibrations may be particularly noticeable when the vehicle is stationary or moving at a relatively low speed such that an operator might expect to experience little to no handwheel vibration.

Accordingly, it is desirable to have an improved system and method for controlling electric power assist of vehicle steering systems wherein current gain may be adjusted so as to achieve increased frequency response (i.e., bandwidth) while also providing for attenuation of handwheel vibration at relatively low speeds.

SUMMARY OF THE INVENTION

In one exemplary embodiment of the invention, a system for controlling operation of a torque-assist motor of an electrical power-assist system of a motor vehicle comprises a motor speed calculation module, a gain calculation module, an error calculation module, a controller module, and an inverter. A motor position sensor is configured and arranged for determining a rotational position of the torque-assist motor, and a current sensor configured to detect an electrical current applied to the torque-assist motor. The motor speed calculation module is configured to produce a motor speed signal that is indicative of a rotational speed of the torque-assist motor and that is based on a change in the rotational position of the torque-assist motor over a period of time. The gain calculation module is configured to produce one or more gain factors based on the rotational speed of the torque-assist motor. The error calculation module is configured to calculate a current error based on a commanded electrical current and the electrical current applied to the torque-assist motor, and the controller module is configured to calculate a quadrature axis voltage based on the current error and the one or more gain factors. The inverter is driven by a direct voltage signal that is phased with the rotational position of the torque-assist motor, and is configured to produce the electrical current applied to the torque-assist motor. A characteristic of the electrical current applied to the torque-assist motor is affected by the quadrature axis voltage.

In another exemplary embodiment of the invention, a method for controlling operation of a torque-assist motor of an electrical power-assist system of a motor vehicle comprises determining a rotational position of the torque-assist motor and producing a motor speed signal that is indicative of a rotational speed of the torque-assist motor and that is based on a change in the rotational position of the torque-assist motor over a period of time. One or more gain factors are produced based on the rotational speed of the torque-assist motor. An electrical current applied to the torque-assist motor is detected, and a current error is calculated based on a commanded electrical current and the electrical current applied to the torque-assist motor. A quadrature axis voltage is calculated based on the current error and the one or more gain factors. An inverter is driven with a direct voltage signal that is phased with the rotational position of the torque-assist motor so as to produce the electrical current applied to the torque-assist motor. The electrical current exhibits a characteristic that is affected by the quadrature axis voltage.

The above features and advantages and other features and advantages of the invention are readily apparent from the following detailed description of the invention when taken in connection with the accompanying drawings.

BRIEF DESCRIPTION OF THE DRAWINGS

The subject matter which is regarded as the invention is particularly pointed out and distinctly claimed in the claims at the conclusion of the specification. The foregoing and advantages and details appear, by way of example only, in the following detailed description of embodiments taken in conjunction with the accompanying drawings in which:

DETAILED DESCRIPTION

Figure 1:
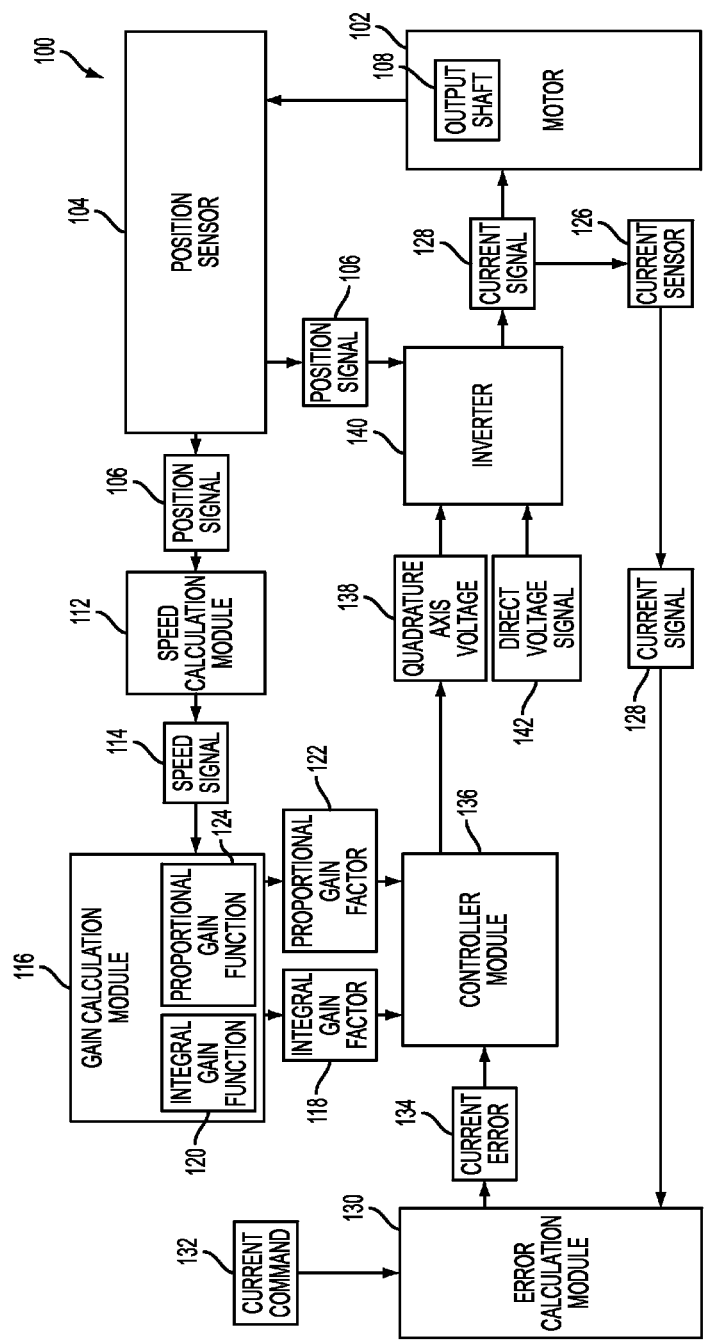
FIG. 1 is a functional block diagram of an exemplary system for controlling operation of a torque-assist motor of an electrical power-assist system of a motor vehicle.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term "module" refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to the Figures, in which the invention will be described with reference to specific embodiments, without limiting same, FIG. 1 shows an exemplary embodiment of a feedback control system 100 that is configured for controlling the operation of a torque-assist motor 102. In the illustrated embodiment, torque assist motor 102 is a permanent-magnet, alternating-current motor configured and arranged so as to provide torque assistance to the steering system (not shown) of a motor vehicle (not shown). To facilitate effective control over the operation of torque-assist motor 102, a motor position sensor 104 is positioned and configured so as to periodically or continuously detect a rotational (i.e., angular) position 106 of the output shaft 108 driven by torque-assist motor 102 and to communicate such detected positions (i.e., information indicative of such detected positions) 106 to a motor speed calculation module 112. Based on the variations in the detected positions 106 of the output shaft 108 over time, the motor speed calculation module 112 produces motor speed signals 114, which are periodically or continuously communicated to a gain calculation module 116.

Figure 2:
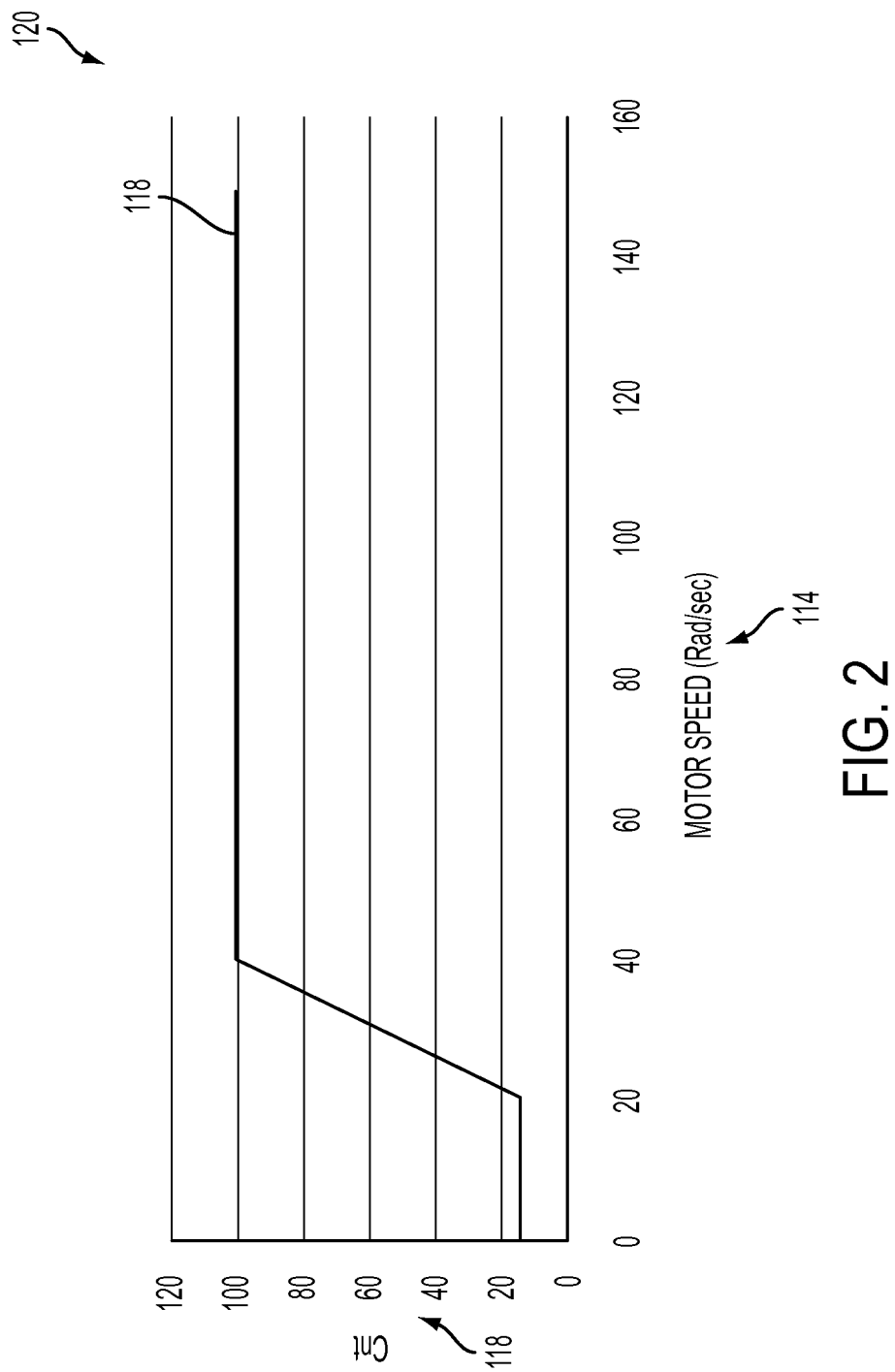
FIG. 2 is a chart showing an exemplary relationship between an integral gain factor and motor speed.

The gain calculation module 116 is configured to produce integral gain factors 118 based on the motor speed signals 114 and a pre-established relationship 120 between the integral gain factors 118 and the motor speed signals 114. The gain calculation module 116 is also configured to produce proportional gain factors 122 based on the motor speed signals 114 and a pre-established relationship 124 between the proportional gain factors 122 and the motor speed signals 114. In an exemplary embodiment, a pre-established relationship 120 between the integral gain factors 118 and the motor speed signals 114, such the exemplary relationship 120 shown on FIG. 2, is used by the gain calculation module 116 to produce the integral gain factors 118 based on the motor speed signals 114.

Figure 3:
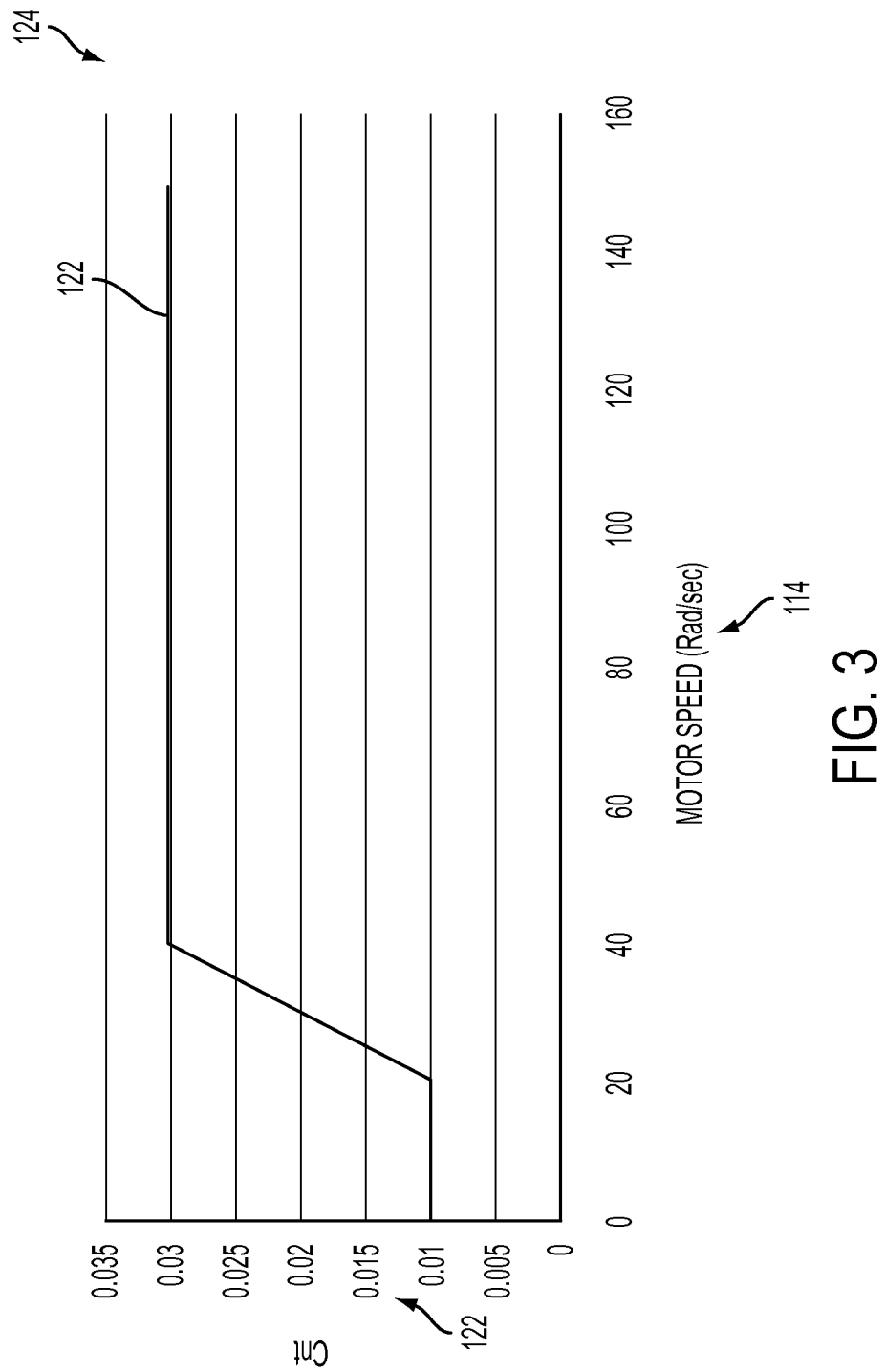
FIG. 3 is a chart showing an exemplary relationship between a proportional gain factor and motor speed.

Similarly, a pre-established relationship 124 between the proportional gain factors 122 and the motor speed signals 114, such the exemplary relationship 124 shown on FIG. 3, is used by the gain calculation module 116 to produce the proportional gain factors 122 based on the motor speed signals 114. In an exemplary embodiment, the relationships 120 and 124 are pre-established based on empirical data and are configured so as to provide acceptably responsive and stable control over the operation of the torque-assist motor 102 while preventing unnecessary amplification of noise that may be inherent in signals used by feedback control system 100.

In an exemplary embodiment, a current sensor 126 is positioned and configured so as to periodically or continuously detect an instantaneous, alternating electrical current 128 that is applied to (i.e., drawn by) the torque-assist motor 102. The current sensor 126 is also configured to communicate such detected electrical current 128, or information indicative of such detected electrical current, to an error calculation module 130. Error calculation module 130 also receives information that is indicative of a commanded electrical current 132 and calculates a current error 134 that is based on a difference between, or a ratio of, the commanded electrical current 132, which is based on a torque applied by the vehicle operator to the vehicle handwheel, and the electrical current 128 that is actually applied to (i.e., drawn by) the torque-assist motor 102. Error calculation module 130 communicates the current error 134 to a controller module 136, which receives the current error 134 from the error calculation module 130 and also receives the integral gain factors 118 and the proportional gain factors 122 from the gain calculation module 116.

The controller module 136 calculates a quadrature axis voltage 138 based on the current error 134, the integral gain factors 118, and the proportional gain factors 122. In an exemplary embodiment, the quadrature axis voltage 138 is based on a sum of two terms, wherein the first term represents a product of the integral gain factors 118 and an integrated (i.e., accumulated) amount of current error 134 over a representative time period, and wherein the second term represents a product of the proportional gain factor 122 and the instantaneous amount of current error 134. The controller module 136 provides the quadrature axis voltage 138 to an inverter (i.e., a switching bridge) 140, which is driven by a direct voltage signal 142 phased with the rotational (i.e., angular) position 106 of the output shaft 108, as sensed by the motor position sensor 104. Being dependent upon the current error 134 and the proportional gain factor 122 and the integral gain factor 118, the quadrature axis voltage 138 is effective to impact the magnitude (i.e. amplitude) of the alternating current 128 that is produced by the inverter 140 and used to drive the torque-assist motor 102.

Since gain calculation module 116 dynamically adjusts the integral gain factors 118 and the proportional gain factors 122 according to the motor speed signals 114, which are indicative of the rotational speed of the torque assist motor 102, and thus the extent of torque assistance being applied to the vehicle handwheel, the gain can be affected via the pre-established relationships 120 and 124 so as to provide relatively greater levels of gain, and thus greater frequency response, at higher torque assist motor speeds while reducing the gain levels at relatively lower at lower speeds. As a result, relatively low gains applied at low motor speeds tend to mitigate the impact of any noise that is present in the current feedback signal at those lower motor speeds, such as where unnecessary amplification of such noise could otherwise cause perceptible vibration in the vehicle handwheel. At the same time, increased gains may be implemented at greater torque-assist motor speeds so as to provide increased frequency response (i.e., higher bandwidth).

Figure 4:
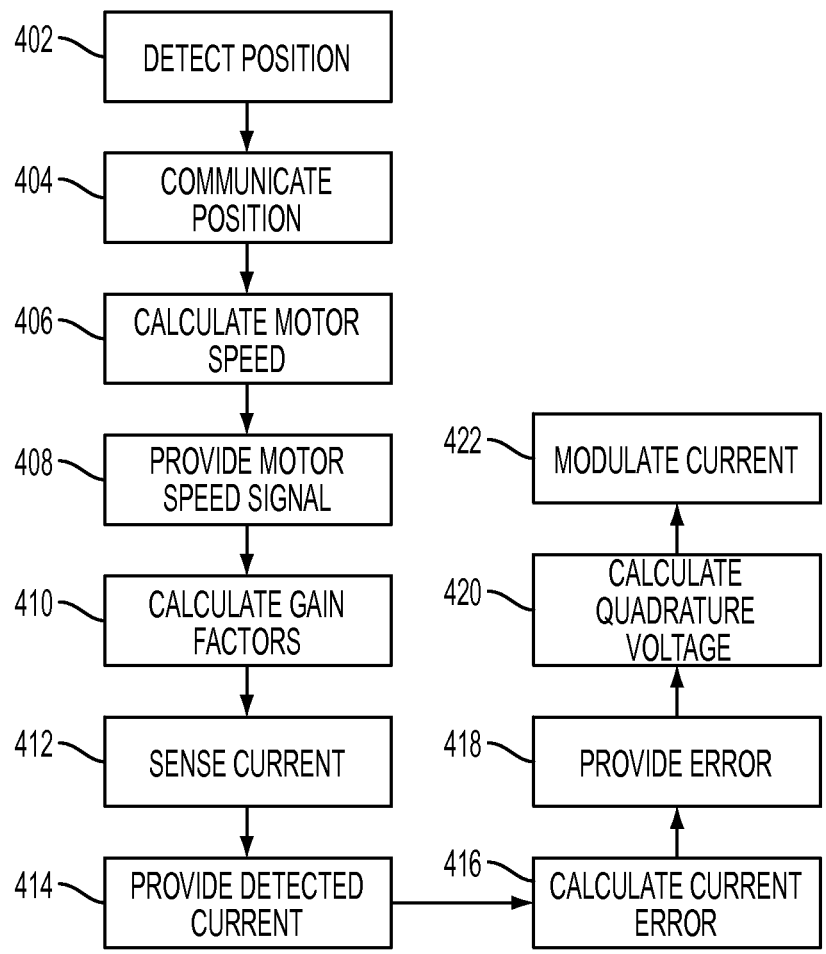
FIG. 4 illustrates a method for controlling operation of a torque-assist motor of an electrical power-assist system of a motor vehicle.

FIG. 4 shows an exemplary method 400 for controlling the operation of a torque-assist motor that is configured and arranged for providing torque assistance to a steering wheel of a motor vehicle. In an exemplary embodiment, a rotational (i.e., angular) position of the output shaft of the torque-assist motor is periodically or continuously detected (step 402) and communicated (step 404) so as to facilitate calculation (step 406) of the motor speed. Signals indicating the calculated motor speed are provided (step 408) so as to facilitate calculation of both integral gain factors and proportional gain factors that are responsive to changes in motor speed (step 410). The calculations of both integral gain factors and proportional gain factors (step 410) may be based on pre-established relationships between the integral and proportional gain factors and the motor velocities. In an exemplary embodiment, these pre-established relationships are configured so as to provide acceptably responsive and stable control over the operation of the torque-assist motor while preventing unnecessary amplification of noise that may be inherent in signals used by feedback control system.

As shown in FIG. 4, in an exemplary embodiment, the instantaneous, alternating electrical current that is actually applied to (i.e., drawn by) the torque-assist motor is periodically or continuously sensed (step 412) so as to facilitate providing (step 414) the detected electrical current, or information indicative of the detected electrical current, to enable calculation (step 416) of an error value that is based on a difference between the detected electrical current and a commanded electrical current (which is itself based on a torque applied to the vehicle handwheel by an operator of the vehicle). The error term is provided (step 418) so as to facilitate calculation (step 420) of a quadrature axis voltage based on the instantaneous error value, and accumulated error value, as well as both the integral gain factor and the proportional gain factor corresponding to the instantaneous speed of the torque-assist motor. In an exemplary embodiment, the quadrature axis voltage is calculated (step 420) based on a sum of two terms, wherein the first term represents a product of the integral gain factors and an integrated (i.e., accumulated) amount of current error over a representative time period, and wherein the second term represents a product of the proportional gain factor and the instantaneous amount of current error.

The quadrature axis voltage is provided (step 422) so as to affect an alternating current produced from a direct voltage signal that is phased with the rotational (i.e., angular) position of the output shaft of the torque-assist motor. Being dependent upon the current error and the proportional gain factor and the integral gain factor, the quadrature axis voltage is effective to impact the magnitude (i.e. amplitude) of the alternating current, which drives the torque-assist motor.

Since the integral gain factors and the proportional gain factors are dynamically adjusted according to the motor speed signals, which are indicative of the rotational speed of the torque assist motor, and thus the extent of torque assistance being applied to the vehicle handwheel, the gain can be affected via the pre-established relationships so as to provide relatively greater levels of gain, and thus greater frequency response, at higher torque assist motor speeds while reducing the gain levels at relatively lower at lower speeds. As a result, relatively low gains applied at low motor speeds tend to mitigate the impact of any noise that is present in the current feedback signal at those lower motor speeds, such as where unnecessary amplification of such noise could otherwise cause perceptible vibration in the vehicle handwheel. At the same time, increased gains may be implemented at greater torque-assist motor speeds so as to provide increased frequency response (i.e., higher bandwidth).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A system for controlling operation of a torque-assist motor of an electrical power-assist system of a motor vehicle, the system comprising:
   a motor position sensor configured and arranged for determining a rotational position of the torque-assist motor;
   a motor speed calculation module configured to produce a motor speed signal that is indicative of a rotational speed of the torque-assist motor and that is based on a change in the rotational position of the torque-assist motor over a period of time;
   a gain calculation module that is configured to:
      produce one or more gain factors based on the rotational speed of the torque-assist motor;
      update the one or more gain factors to provide relatively lower gain when the motor speed signal changes to indicate a relatively lower rotational speed of the torque-assist motor; and
      update the one or more gain factors to provide relatively higher gain when the motor speed signal changes to indicate a relatively higher rotational speed of the torque-assist motor;
   a current sensor configured to detect a drawn electrical current that is being drawn by the torque-assist motor;
   an error calculation module configured to calculate a current error based on a commanded electrical current and the drawn electrical current being drawn by the torque-assist motor;
   a controller module configured to calculate a quadrature axis voltage based on the current error and the one or more gain factors; and
   an inverter driven by a direct voltage signal that is phased with the rotational position of the torque-assist motor, the inverter configured to produce an electrical current to be applied to the torque-assist motor, a characteristic of the electrical current to be applied to the torque-assist motor being affected by the quadrature axis voltage.

2. The system of claim 1, wherein the one or more gain factors are based on a pre-established relationship based on the rotational speed of the torque-assist motor.

3. The system of claim 1, wherein the one or more gain factors comprise an integral gain factor.

4. The system of claim 1, wherein the one or more gain factors comprise a proportional gain factor.

5. The system of claim 1, wherein a magnitude of the one or more gain factors increases with increasing rotational speed of the torque-assist motor.

6. The system of claim 2, wherein the pre-established relationship is configured to provide relatively lower gain at relatively lower rotational speeds of the torque-assist motor.

7. The system of claim 2, wherein the pre-established relationship is configured to provide relatively higher gain at relatively higher rotational speeds of the torque-assist motor.

8. The system of claim 3, wherein the controller module is configured to calculate the quadrature axis voltage based on a product of the integral gain factor and an error integral representing a quantity of current error accumulated during an interval of time.

9. The system of claim 4, wherein the controller module is configured to calculate the quadrature axis voltage based on a product of the current error and the proportional gain factor.

10. The system of claim 1:
   wherein the one or more gain factors comprise an integral gain factor and a proportional gain factor; and
   wherein the controller module is configured to calculate the quadrature axis voltage based on a sum comprising:
      a product of the current error and the proportional gain factor, and
      a product of the integral gain factor and an error integral representing a quantity of current error accumulated during an interval of time.

11. A method for controlling operation of a torque-assist motor of an electrical power-assist system of a motor vehicle, the method comprising:
   determining a rotational position of the torque-assist motor;
   producing a motor speed signal that is indicative of a rotational speed of the torque-assist motor and that is based on a change in the rotational position of the torque-assist motor over a period of time;
   producing one or more gain factors based on the rotational speed of the torque-assist motor;
   updating the one or more gain factors to provide relatively lower gain when the motor speed signal changes to indicate a relatively lower rotational speed of the torque-assist motor;
   updating the one or more gain factors to provide relatively higher gain when the motor speed signal changes to indicate a relatively higher rotational speed of the torque-assist motor;
   detecting a drawn electrical current being drawn by the torque-assist motor;
   calculating via a controller module a current error based on a commanded electrical current and the drawn electrical current being drawn by the torque-assist motor;
   calculating via a controller module a quadrature axis voltage based on the current error and the one or more gain factors;
   driving an inverter with a direct voltage signal that is phased with the rotational position of the torque-assist motor so as to produce an electrical current to be applied to the torque-assist motor; and applying the updated electrical current to the torque-assist motor;

wherein the electrical current to be applied to the torque-assist motor exhibits a characteristic that is affected by the quadrature axis voltage.

12. The method of claim 11, wherein the one or more gain factors are based on a pre-established relationship based on the rotational speed of the torque-assist motor.

13. A method for controlling operation of a torque-assist motor of an electrical power-assist system of a motor vehicle, the method comprising:

determining a rotational position of the torque-assist motor at selected times;

producing a motor speed signal that is indicative of a rotational speed of the torque-assist motor and that is based on a change in the rotational position of the torque-assist motor over a period of time;

producing one or more first gain factors based on the rotational speed of the torque-assist motor;

detecting a drawn electrical current being drawn by the torque-assist motor;

calculating, via a controller module, a current error based on a commanded electrical current and the drawn electrical current being drawn by the torque-assist motor;

calculating, via a controller module, a first quadrature axis voltage based on the current error and the one or more first gain factors;

driving an inverter with a direct voltage signal that is phased with the rotational position of the torque-assist motor so as to produce an electrical current to be applied to the torque-assist motor, the electrical current exhibiting a characteristic that is affected by the first quadrature axis voltage;

applying the electrical current to the torque-assist motor;

subsequently producing a motor speed signal that is indicative of a rotational speed of the torque-assist motor at a subsequent time and that is based on a change in the rotational position of the torque-assist motor over a period of time associated with the subsequent time;

producing one or more second gain factors to provide relatively lower gain-based on if the rotational speed of the torque-assist motor at the subsequent time is relatively low;

producing one or more second gain factors to provide relatively higher gain if the rotational speed of the torque-assist motor at the subsequent time is relatively high;

detecting a drawn electrical current being drawn by the torque-assist motor approximately at the subsequent time;

calculating, via a controller module, a current error based on the commanded electrical current and the drawn electrical current at the subsequent time;

calculating at the subsequent time, via a controller module, the quadrature axis voltage based on the current error and the one or more gain factors;

driving an inverter with a direct voltage signal that is phased with the rotational position of the torque-assist motor so as to produce an electrical current to be applied to the torque-assist motor, the electrical current exhibiting a characteristic that is affected by the quadrature axis voltage as calculated at the subsequent time; and applying the electrical current to the torque-assist motor.

14. The method of claim 11, wherein the one or more gain factors comprise a proportional gain factor.

15. The method of claim 11, wherein a magnitude of the one or more gain factors increases with increasing rotational speed of the torque-assist motor.

16. The method of claim 12, wherein the pre-established relationship is configured to provide relatively lower gain at relatively lower rotational speeds of the torque-assist motor.

17. The method of claim 12, wherein the pre-established relationship is configured to provide relatively higher gain at relatively higher rotational speeds of the torque-assist motor.

18. The method of claim 13, wherein the one or more gain factors comprise an integral gain factor, wherein the calculating the quadrature axis voltage is based on a product of the integral gain factor and an error integral representing a quantity of current error accumulated during an interval of time.

19. The method of claim 14, wherein the calculating the quadrature axis voltage is based on a product of the current error and the proportional gain factor.

20. The system of claim 11:

wherein the one or more gain factors comprise an integral gain factor and a proportional gain factor; and wherein the calculating the quadrature axis voltage is based on a sum comprising:

a product of the current error and the proportional gain factor, and a product of the integral gain factor and an error integral representing a quantity of current error accumulated during an interval of time.

\* \* \* \* \*